Feb. 24, 1925.
G. N. HEIN
1,527,303
VISOR AND ATTACHING MEANS THEREFOR
Filed Jan. 12, 1924
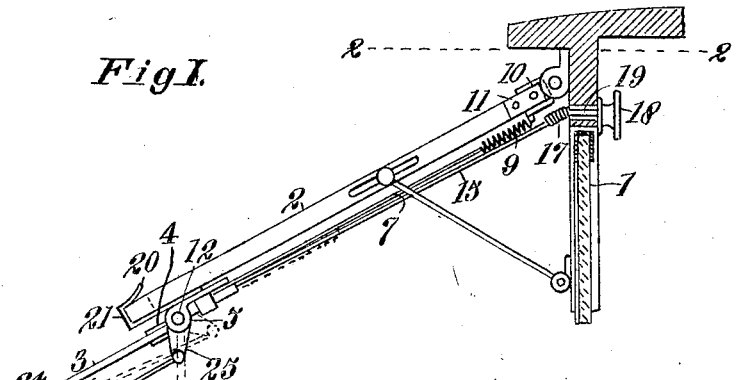
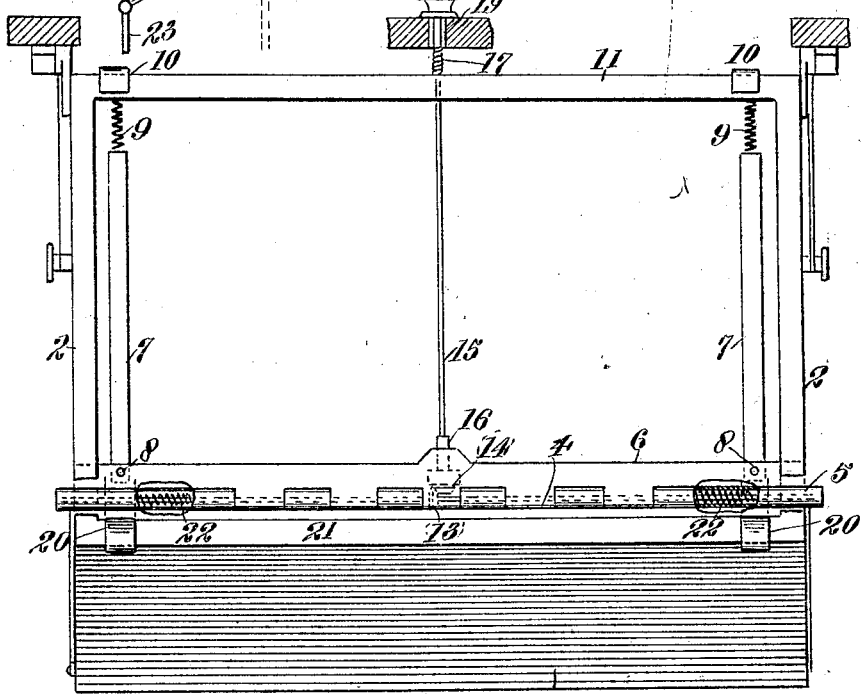
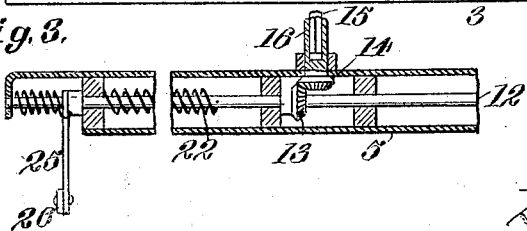
Inventor
George N. Hein Patented Feb. 24, 1925.

1,527,303

UNITED STATES PATENT OFFICE.

GEORGE N. HEIN, OF SAN FRANCISCO, CALIFORNIA.

VISOR AND ATTACHING MEANS THEREFOR.

Application filed January 12, 1924. Serial No. 685,791.

*To all whom it may concern:*

Be it known that I, GEORGE N. HEIN, a citizen of the United States, residing at city and county of San Francisco and State of California, have invented certain new and useful Improvements in Visors and Attaching Means Therefor, of which the following is a specification.

Motor vehicles are in some cases provided with standard equipment consisting in part of a visor extending angularly in advance of the windshield and adjustable only from the exterior of the vehicle.

The present invention relates to an attachment for this type of visor enabling a section or auxiliary visor to be mounted on the free edge of the permanent visor and have ready adjustment from the interior of the vehicle compartment to enable the operator to shade the light rays from his eyes. A further object of the present invention is to provide a means for readily and detachably securing this auxiliary movable visor to the free edge of the permanent visor, and to provide an operating means adapted for changing the angle of the movable visor. A further object is to provide in connection with the movable visor a translucent member at its free edge capable of depending therefrom when the auxiliary visor is in its extended position, the movable visor and translucent member adapted for movement to a position to lie in parallelism with and beneath the main visor.

With the above-mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Figure 1 is a view in side elevation of one embodiment of my invention in position on a vehicle of the enclosed type.

Fig. 2 is a view taken on line 2—2 of Fig. 1 with parts of the invention broken away.

Fig. 3 is a longitudinal sectional view through the hinge illustrating the interior thereof.

In the drawings, 1 indicates a vehicle windshield of any conventional or well-known type and extended angularly in advance thereof is a visor or sunshade 2, preferably of the type adjustable only from a point in front of the windshield and of a type commonly termed the fixed visor type. As illustrated in the drawings, I detachably secure to the fixed visor a movable visor 3 of any suitable construction and material, the latter being of a depth considerably less than that of the visor 2. One form of attaching means is illustrated in the present application and the same is constructed in the following manner.

To the member 4 of a hinge 5 there is secured one edge of a movable visor 3, as illustrated in the drawings and extended from the member 6 of the hinge 5 are strap members 7 secured thereto by pivot pins 8. The strap members are adapted to lie beneath and parallel with the under side of the fixed visor 2 and are connected through coiled tension springs 9 with attaching hooks 10, which are adapted to hook over the inner edge 11 of the fixed visor 2 as illustrated in the drawings. The members 7 are preferably three in number, one at each end of the hinge section 6 and one in the center thereof. The hinge sections are connected by a pintle 12 fixed to rotate with the hinge section 4 and said pintle preferably centrally of its length mounts a beveled gear 13 with which intermeshes the pinion 14 rotatably mounted as at 16 in a bearing in the hinge section 6. Slidably associated with the member 16, with its end received in a depression therein, is an operating rod or shaft 15, the end of which connects through a flexible or universal joint connection 17 with an operating handle 18 carried by a shaft 19 rotatable in a bearing in the shield structure 1. The handle 18 is preferably positioned within convenient reach of the vehicle operator. To secure the movable or auxiliary visor to the free edge of the fixed visor 2 and provide suitable hooks 20 which extend outwardly from the upper surface of the hinge section 6, the hooks being bent upwardly to engage as in the drawing over the free edge 21 of the fixed visor 2. These hooks are preferably three in number to correspond with the members 7. Coiled springs 22 surrounding the pintle 12 bear on the hinge sections 4 and 6 assist in maintaining the movable visor 3 in its outwardly extended position.

To assist the operator in safely driving the vehicle at night, I have illustrated in the drawings a translucent member 23 pivotally mounted as at 24 to the under side of the free edge of the visor 3, this member being of a depth materially less than that of the visor 3 and if desirable may be of a length coextensive therewith or less than that of the visor 3. Fixed to rotate with the pintle 12 at its end is an arm 25 connected through a link 26 with the translucent member 23 at a point slightly below its point of fulcrum and it will be observed that this arm and link connection between the pintle and member 23 will enable the member 23 to be held in a vertical position depending from the free edge of the movable visor when said movable visor is in extended position and will also enable the translucent member to extend parallel with the movable visor and the two lie beneath the fixed visor 2 when it is desired to swing the movable visor beneath the fixed visor 2. It is to be understood that in certain installations, the member 23, arm 25 and link 26 may be eliminated and the movable visor 3 employed in connection with its attaching means and adjusting means.

I claim:

1. In combination with a vehicle windshield, a main visor projecting outwardly therefrom, an auxiliary visor fulcrumed near the free edge of the main visor to pivot on an axis parallel with the outer free edge of the main visor and to operatively project forwardly at an inclined angle beyond the free edge thereof, means for securing the auxiliary visor to the main visor, means extending from the auxiliary visor to a point in rear of the windshield for operation to change the angle of the auxiliary visor and for swinging the same to lie beneath the main visor in parallelism therewith, and a translucent member mounted to operatively depend vertically from the free edge of the auxiliary visor and movable with the auxiliary visor to lie in alignment therewith and beneath the vehicle windshield.

2. An auxiliary visor including a visor member, a hinge at one edge thereof consisting of two hinge members and a uniting pintle, means for securing one hinge member to the auxiliary visor, a connection between the pintle and said hinge member, a gear fixed to the pintle, a pair of hook members extending from each side of the other hinge member, and a gear rotatably supported by said other hinge member and engaging said first-mentioned gear.

3. An auxiliary visor including a visor member, a hinge at one edge thereof consisting of two hinge members and an uniting pintle, means for securing one hinge member to the edge of the auxiliary visor, a pair of hook members extending from each side of the other hinge member, a yieldable connection between the respective hooks at opposite sides of the said hinge member, and operating means associated with the first-mentioned hinge member.

In testimony whereof I have signed my name to this specification.

GEORGE N. HEIN.